W. B. LOUTHAN.
DIRECTION INDICATOR.
APPLICATION FILED APR. 17, 1920.
1,377,082.
Patented May 3, 1921.
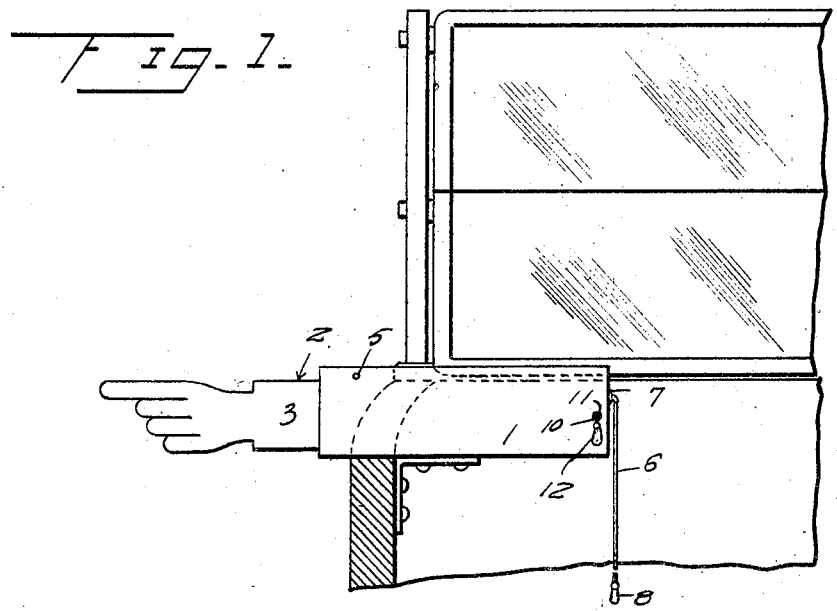
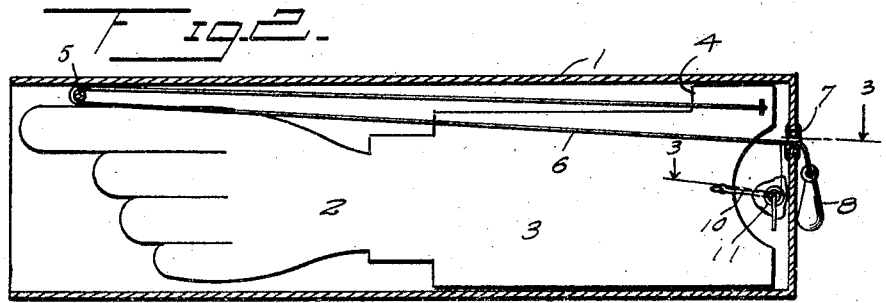
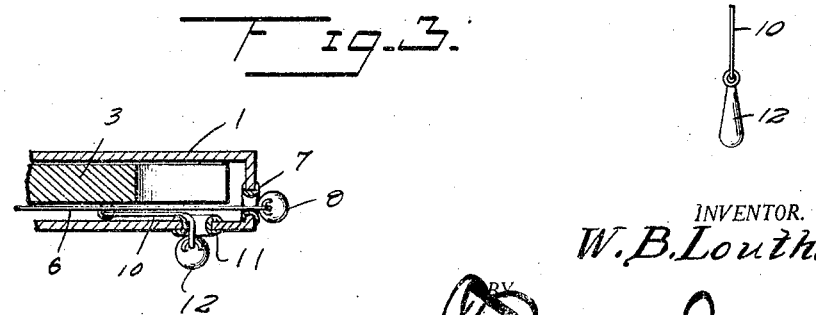
INVENTOR.
W. B. Louthan.
ATTORNEY.

UNITED STATES PATENT OFFICE.

WALLACE B. LOUTHAN, OF MARSHALLTOWN, IOWA.

DIRECTION-INDICATOR.

1,377,082.　　　　Specification of Letters Patent.　　Patented May 3, 1921.

Application filed April 17, 1920. Serial No. 374,692.

*To all whom it may concern:*

Be it known that I, WALLACE B. LOUTHAN, a citizen of the United States, residing at Marshalltown, in the county of Marshall and State of Iowa, have invented certain new and useful Improvements in Direction-Indicators; and I do hereby declare the following to be a full, clear, and exact description of the invention, such as will enable others skilled in the art to which it appertains to make and use the same.

This invention relates to new and useful improvements in direction indicators and has for its primary object the provision of means which may be easily and quickly operated by the driver of an automobile to extend and retract a signal in its housing or casing to warn traffic the direction in which a turn is to be made, thereby obviating accidents and collisions caused by warnings not being given prior to a turn or if given by extending the hand laterally of the automobile causes accidents by the inability of the driver not being able to control the automobile with one hand.

Another object of this invention is the provision of a signal movable into and out of the casing and which will maintain either of its positions until again manually operated, thereby allowing the driver to use both hands in steering when making a turn from a straight course.

A further object of this invention is the provision of a direction indicator of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description, and accompanying drawing, in which:—

Figure 1 is a side elevation of a direction indicator illustrating the signal in signaling position and constructed in accordance with my invention, Fig. 2 is a vertical sectional view illustrating the signal within the casing or in a non-signaling position, Fig. 3 is a detail sectional view illustrating eyelets for the actuating cords.

Referring in detail to the drawing, the numeral 1 indicates as an entirety an elongated or rectangular casing having one end closed while its other and is fully open to permit a signal 2 to extend outwardly of said casing for warning traffic of the intention of the operator to make a turn from a straight course.

The casing 1 may be secured to the automobile in any desired manner and any number of casings or indicators can be applied to the automobile and preferably one on each side of said automobile. However, an additional indicator may be placed at the rear of the automobile to indicate a stop or the like and the actuating cords thereof may extend to a point on the automobile in convenient reach of the operator. As all of the indicators that are employed on the automobile are identical in construction to each other, reference to one is thought sufficient for all.

The signal 2 includes a body 3 that has formed on one end a hand or any other character and said body is slidably mounted within the casing 1 and has formed thereon a shoulder 4 adapted to engage a pin 5 carried by said casing for limiting the movement of the body 3 outwardly of the casing. A cord or flexible element 6 is secured to the inner end of the body 3 and is extended forwardly and around the pin 5 and outwardly of the casing 1 by way of an eyelet 7 secured in the end wall of said casing and said cord has secured to its ends a knob or finger grip 8 so that upon pulling upon said cord or flexible element 6 the signal 2 will be moved into a signaling position or exteriorly of the casing. A cord or flexible element 10 is secured to the inner end of the body 3 and extends outwardly through an eyelet 11 located in one of the side walls of the casing adjacent the end wall and said cord or flexible element 10 has secured thereto a knob or finger grip 12 so that the driver can readily grip the same and return the signal 2 into a non-signaling position or within the casing.

From the foregoing description taken in connection with the accompanying drawings, it will be noted that a very efficient indicator has been provided which can be easily and conveniently actuated by the driver of an automobile and also that the indicator can be easily and quickly applied to an automobile without altering the construction thereof, and further that said indicator may be applied to any point desired on the automobile.

While I have shown and described the preferred embodiment of my invention, it will be understood that minor changes in construction, combination, and arrangement of parts may be made without departing from the spirit and scope of the invention as claimed.

Having thus described my invention, what I claim is:—

A direction indicator comprising a casing having one end fully open and its other end closed by an end wall having an aperture, said casing having an aperture in one of its side walls adjacent its closed end and in a plane below the aperture in the end wall, a signaling element slidably mounted in the casing, a pin secured in the casing adjacent its open end, and operating cables entering the casing by way of the apertures and one of said cables extending forwardly in the casing and about the pin and rearwardly and secured to the inner end of the signaling element, said other cable secured to the inner end of the signaling element.

In testimony whereof I affix my signature in presence of two witnesses.

WALLACE B. LOUTHAN.

Witnesses:
JOHN FRANKS,
H. PARLOW.